United States Patent [19]

Ellis et al.

[11] Patent Number: 5,282,961
[45] Date of Patent: Feb. 1, 1994

[54] FLOATING IMPELLER ASSEMBLY

[75] Inventors: Robert Ellis, Wyckoff; Allan H. Willinger, Franklin Lake, both of N.J.; Jonas A. Ivasauskas, W. Nyack; Gene Fleischer, Spring Valley, both of N.Y.

[73] Assignee: Willinger Bros., Inc., Oakland, N.J.

[21] Appl. No.: 81,671

[22] Filed: Jun. 23, 1993

[51] Int. Cl.[5] .............................................. A01K 63/04
[52] U.S. Cl. ................... 210/169; 210/416.2; 119/259; 416/169 R
[58] Field of Search ................ 210/169, 416.2; 119/5; 416/169.7; 417/423.3, 424.1, 423.7, 423.14

[56] References Cited

U.S. PATENT DOCUMENTS

| | | | |
|---|---|---|---|
| 3,744,180 | 7/1973 | Mabuchi | 416/169 R |
| 4,512,885 | 4/1985 | Willinger | 210/169 |
| 4,602,996 | 7/1986 | Willinger | 210/169 |
| 4,735,715 | 4/1988 | Willinger | 210/169 |
| 4,820,410 | 4/1989 | Cavalcante | 210/169 |
| 4,842,727 | 6/1989 | Willinger et al. | 210/169 |
| 4,861,468 | 8/1989 | Willinger et al. | 210/169 |
| 4,985,181 | 1/1991 | Strada et al. | 210/169 |
| 5,039,286 | 8/1991 | Point et al. | 417/423.3 |
| 5,238,367 | 8/1993 | Ellis et al. | 210/416.2 |

*Primary Examiner*—Stanley S. Silverman
*Assistant Examiner*—Robert James Popovics
*Attorney, Agent, or Firm*—Helfgott & Karas

[57] ABSTRACT

A floating impeller assembly for use with an electromagnetic stator unit includes a stationary shaft with a magnetic rotor rotationally mounted on the shaft. An impeller unit is rotationally mounted on the shaft and a unitary retaining and clutch mechanism between the magnetic rotor and the impeller unit drives the impeller unit by means of rotation of the magnetic rotor. The magnetic rotor and the impeller float on the shaft facilitating reducing the noise, friction and wear, heretofore, present in prior art units. The floating impeller assembly is used within an aquarium filter for drawing water from the aquarium into the aquarium filter for filtration and discharge back into the aquarium tank.

20 Claims, 12 Drawing Sheets

FLOATING IMPELLER ASSEMBLY

BACKGROUND OF THE INVENTION

This invention relates to a magnetic rotor impeller and more particularly to a floating impeller assembly for use with an electromagnetic unit for drawing aquarium water into an aquarium filter for the purpose of filtration of contaminated aquarium water.

The prior art related to magnetic rotor assemblies includes U.S. Pat. Nos. 4,512,885 and 4,861,468 and a unit which incorporates a snap-fit assembly.

In U.S. Pat. No. 4,512,885 there is described an external aquarium filter which includes a rotor magnetically coupled to an electromagnetic stator unit. An impeller is mounted with respect to the rotor for driving engagement by the rotor. In such aforementioned patent, the electromagnetic stator unit is removably coupled to the filter housing and includes a well hermetically separated from the stator stack. The rotor is part of an assembly which comprises a shaft which is fixed with respect to the stator unit. The rotor is rotatingly positioned on the shaft. A magnet is insert molded onto the rotor. The impeller is likewise rotatingly mounted onto the shaft and is operatively connected to be driven by the rotor. The electromagnetic stator unit creates a flux which is cut by the magnet to cause the rotor to rotate upon the shaft and drive the impeller. The impeller creates a reduced pressure which draws the aquarium water into the filter housing for filtration and aeration.

The rotor assembly in the aforementioned patent forms a single unitary assembly including the shaft, the rotor, the magnet mounted onto the rotor, and the impeller. A washer is mounted onto the shaft in order to accommodate thrust forces which are generated by the assembly and reduce noise caused by rubbing of the impeller against the plugs. The plugs are placed at opposing ends of the shaft to fix it in position with one end seated into the well and the other end fixed into an appropriate seat provided in the intake tube.

In U.S. Pat. No. 4,861,468 there is described a rotor impeller assembly which includes a shaft with a magnetic rotor rotationally mounted onto the shaft. An impeller coupled onto a sleeve is also rotationally mounted with respect to the shaft. A clutch mechanism is provided on the inside of the sleeve between the magnetic rotor and the impeller sleeve which rotationally drives the impeller by means of the rotation of the magnetic rotor. A thrust washer is placed on the shaft to accommodate thrust forces generated by the assembly and to reduce the noise caused by rubbing of the impeller against the plugs.

In an additional rotor impeller which is part of the prior art the rotor is mounted onto a shaft with the rotor extended beyond the magnet portion. The impeller, again coupled to a sleeve, and the rotor are assembled by moving them axially toward each other until the impeller sleeve covers a portion of the extended rotor and the geometry of the impeller sleeve flexes and the impeller sleeve snaps onto the extended portion of the rotor. A clutch mechanism, likewise, is provided on the inside of the sleeve. This assembly requires the achievement and maintenance of tight tolerances in the engagement geometry of the two parts in order to accomplish the snap-fit assembly. The maintenance of these tight tolerances requires time consuming and costly procedures during the fabrication of molds for the component parts and costly quality control procedures for every production run. Additional disadvantages of this construction include the need for the extended rotor unit to accommodate the snap-on sleeve of the impeller. This extended rotor results in difficulty in molding due to post molding distortion; i.e., bowing of parts which results in problems in maintaining accurately the coaxial rotation of the rotor.

Both types of prior art impeller assemblies have wide sleeves supporting the impeller with the clutch mechanism inside the sleeve. This large projected area of the impeller assembly just below the impeller blades causes a lift of the impeller assembly. The lifting of the assembly causes the assembly to rub against the support structure resulting in the generation of friction, wear, and objectionable noise.

SUMMARY OF THE INVENTION

It is an object of the present invention to provide a floating impeller assembly which permits the rotor to float in order to reduce the noise, friction, and wears on the assembly.

A further object of the present invention is to provide a floating impeller assembly which eliminates the need for close tolerance manufacture to provide a snap-fit assembly in order to connect the rotor, and the impeller.

Still another object of the present invention is to provide a floating impeller assembly which eliminates the need for an antifriction washer to prevent rubbing of the assembly against the support structure.

Yet a further object of the present invention is to provide a floating impeller assembly which utilizes a narrow sleeve and incorporates a clutch mechanism on the exterior of the sleeve to reduce the effect of a large projected area which causes lift up.

Briefly, in accordance with the present invention, there is provided a floating impeller assembly for use with an electromagnetic stator unit. The assembly includes a stationary shaft, a rotatably mounted magnetic rotor and a rotatably mounted impeller unit, and specifically on the exterior of the impeller sleeve. The impeller is mounted on a narrow sleeve. A unitary retaining and clutch mechanism is provided between the rotor and the impeller unit. This unitary mechanism retains the impeller onto the rotor and drives the impeller unit by means of the rotation of the magnetic rotor. The unitary retaining and clutch mechanism is formed as part of the upper flange of the rotor and eliminates the need for a snap together fit. It also permits the use of a narrow sleeve supporting the impeller and, thereby, reduces the lift of the assembly during operation. Both the rotor and the impeller unit float on the shaft in an unrestrained manner enabling the rotor to become positioned in a suitable relationship taking both the lift and magnetic forces into consideration.

The particular construction permits an assembly which does not require snapping together of parts. All that is required is that the impeller is slid horizontally along the upper flange of the rotor and then the shaft is inserted through the coupled impeller and rotor and serves to lock together the unit.

Since there is no snap action required between the impeller and rotor, there are no tight tolerances in the engagement geometry of the two parts which have to be achieved and maintained. This cuts down on time and expense during grooming-in of the impeller and rotor molds, and again during the quality control process at every production run. This also results in a much greater positive engagement area between the impeller and rotor since no limitation imposed by flexing is involved. This better engagement will improve the reliability of the assembly. Furthermore, a variety of materials with different stiffnesses can be used with the design according to the present invention without changing the engagement geometry of the impeller and rotor. Even inflexible materials such as ceramic could be used for both the impeller and rotor. In contrast, the engagement geometry in a snap design would need to be revised to accommodate a significant change in stiffness, and with very stiff materials, the parts could be prone to damage during assembly.

The floating impeller assembly also facilitates utilization of a magnet which could be slid onto the rotor unit and then locked into position onto the rotor either through integrally formed deflection tabs or external locking means.

The floating impeller assembly of the present invention finds use as an impeller for drawing water through an aquarium filter. The water enters the filter through an intake assembly and is stored in a receiving chamber. The water then passes to a filtering chamber where it flows through filtering material to remove contaminating debris and particles. The water is then discharged back to the aquarium tank in a filtered and aerated condition.

The aforementioned objects, features and advantages of the invention will, in part, become obvious from the following more detailed description of the invention, taken in conjunction with the accompanying drawings, which form an integral part thereof.

BRIEF DESCRIPTION OF THE DRAWINGS

In the drawings.

In the various figures like reference characters designate like parts.

DETAILED DESCRIPTION OF THE INVENTION

Figure 1:
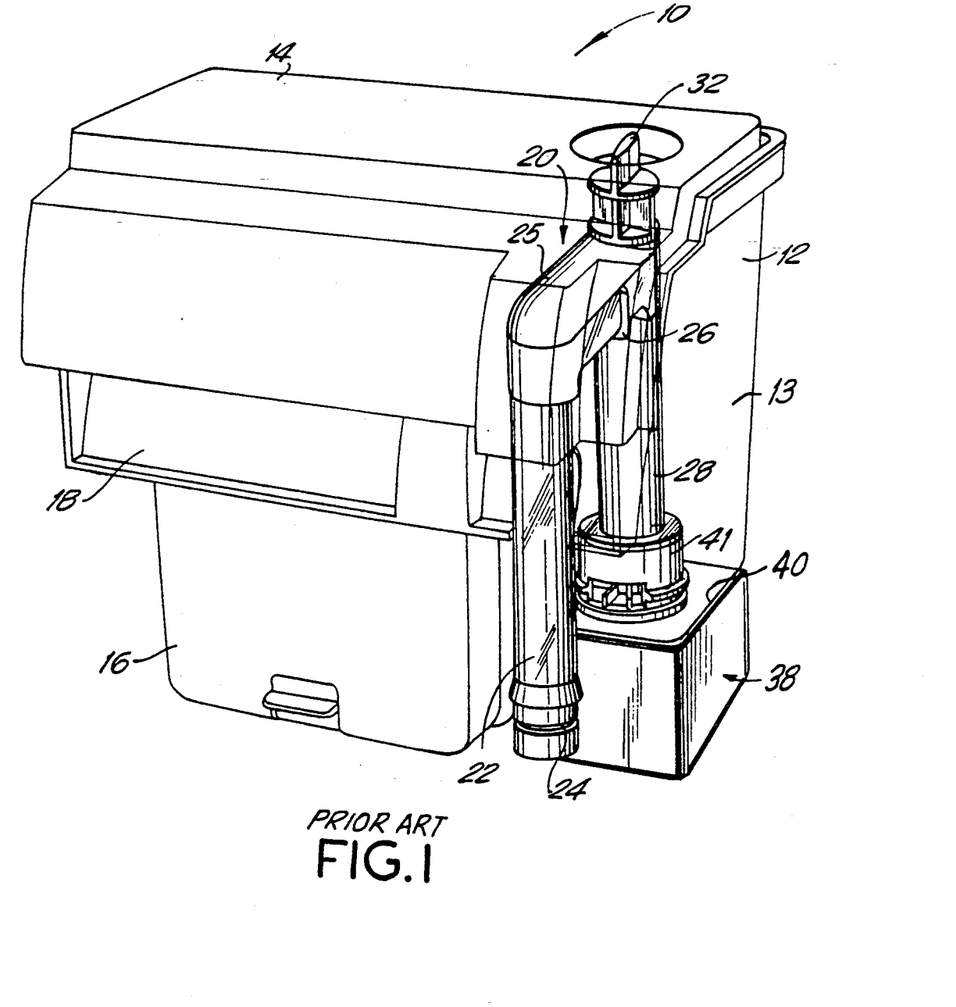
FIG. 1 is a perspective view of an aquarium filter showing a unitary intake assembly from which depends the floating impeller assembly of the present invention inserted into an electromagnetic stator unit coupled to the filter housing.
Figure 2:
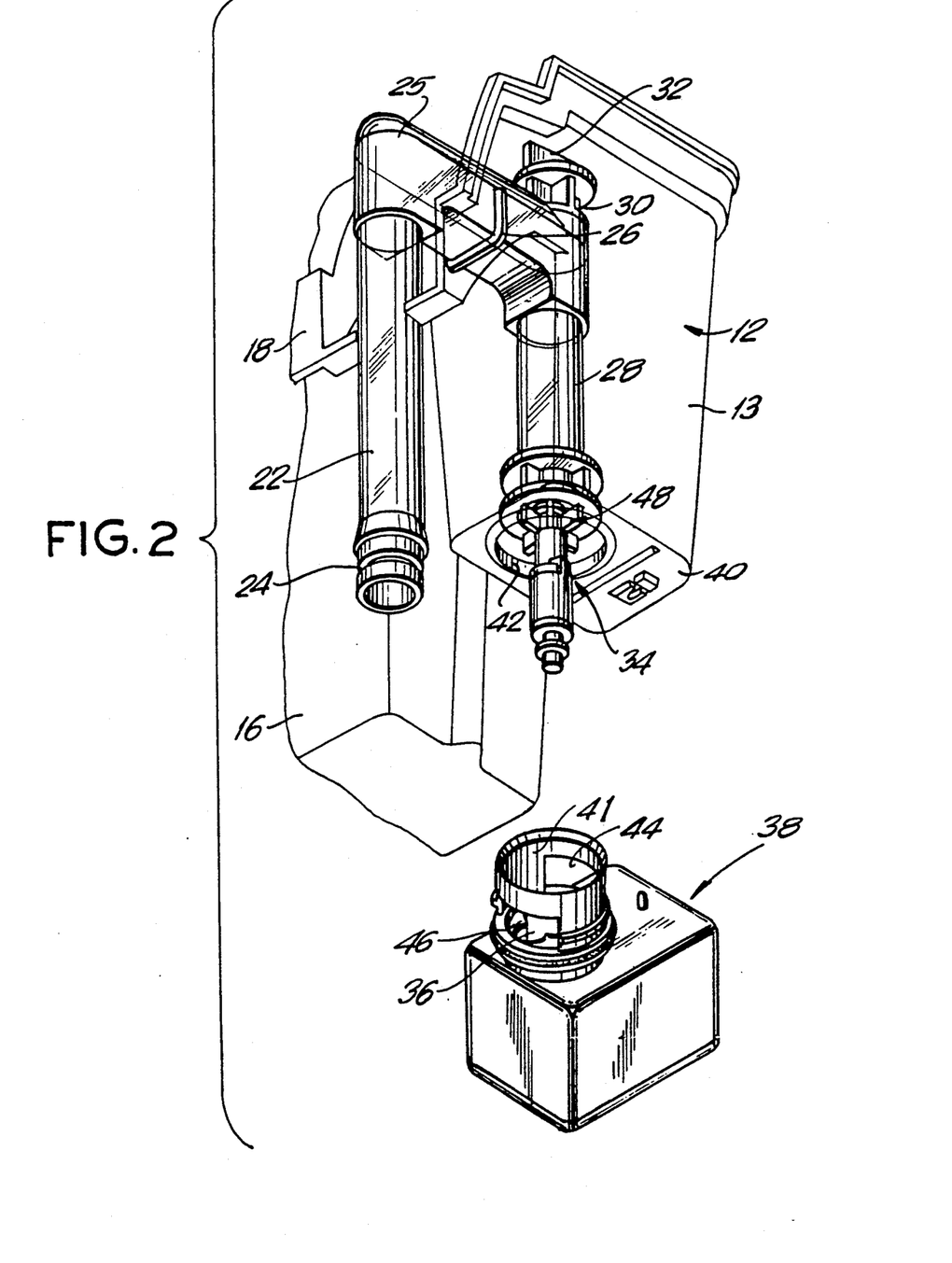
FIG. 2 is a broken away perspective view of the filter of FIG. 1 and showing the electromagnetic stator unit separated from the filter housing to expose the impeller assembly.
Figure 3:
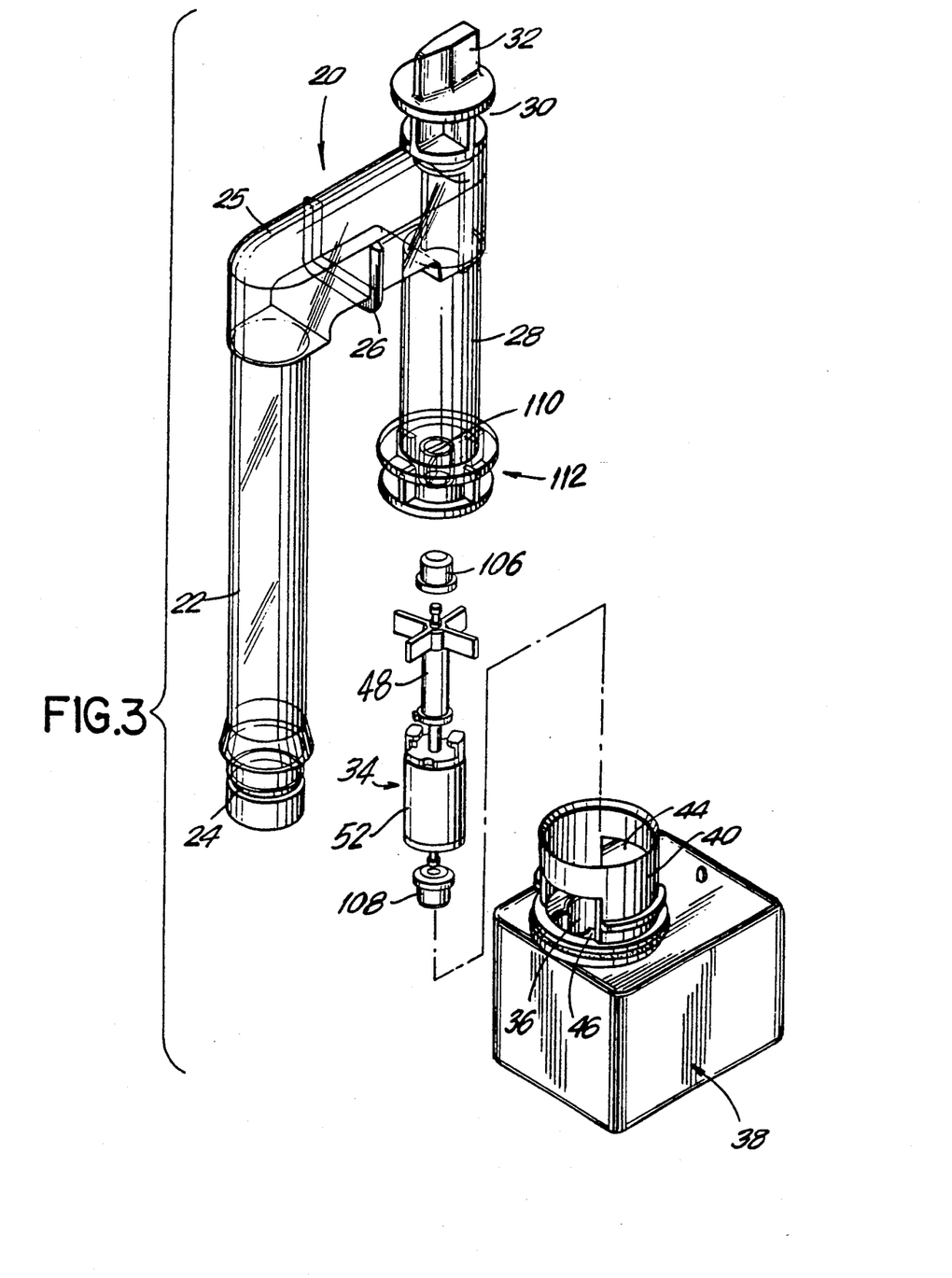
FIG. 3 is an exploded perspective view of the unitary intake assembly and the floating impeller assembly for insertion into the electromagnetic stator unit.

Referring to FIGS. 1-3, there is generally shown an external aquarium filter 10 which would be placed over the exterior wall of an aquarium tank. The aquarium filter includes a filter housing 12 on which is provided a removable cover 14. Within the housing there is a receiving chamber 13 in which is received the contaminated aquarium water. The water then passes into a filter chamber 16 in which there is provided filter material such as a filter cartridge as described in U.S. Pat. No. 4,783,258. The filtered water is then discharged along a spillway 18 from which the water passes back to the aquarium tank. For more details of the construction of the filter reference is had to U.S. Pat. Nos. 4,512,885 and 4,602,996.

To bring the water into the aquarium tank there is provided a unitary intake assembly 20, as can best be noted in FIG. 3. The intake assembly includes an elongated downwardly depending intake tube 22 at the end of which there is a coupling connector 24 for facilitating connection to additional extensions in order to reach the aquarium tank water. A substantially horizontal leg 25 includes a positioning rib 26 for seating the intake assembly onto the aquarium housing unit, as best shown in FIGS. 1 and 2. A further downward depending leg 2 extends into the receiving chamber of the filter housing, as can best be seen in FIG. 2. A control valve 30, including an externally manipulable knob 32 is positioned along the interconnected legs of the unitary intake assembly to control the amount of water flow from the aquarium tank. For further details of the control valve reference is had to U.S. Pat. No. 4,602,996.

Depending from the unitary intake assembly is a floating impeller assembly, shown generally at 34. The floating impeller assembly is designed to fit into a well 36 which extends into an electromagnetic stator unit 38.

The electromagnetic stator unit 38 is removably connected at the bottom 40 of the receiving chamber of the filter housing 12. It includes an upwardly extending collar 41 which is received within an aperture 42 provided at the bottom of the filter housing 12. A pair of openings 44, 46 on either side of the collar are positioned to correspond to the location of an impeller unit 48. For more details of the stator unit, the collar, and the interconnection between the collar and the filter, reference is had to U.S. Pat. No. 4,735,715.

Figure 4:
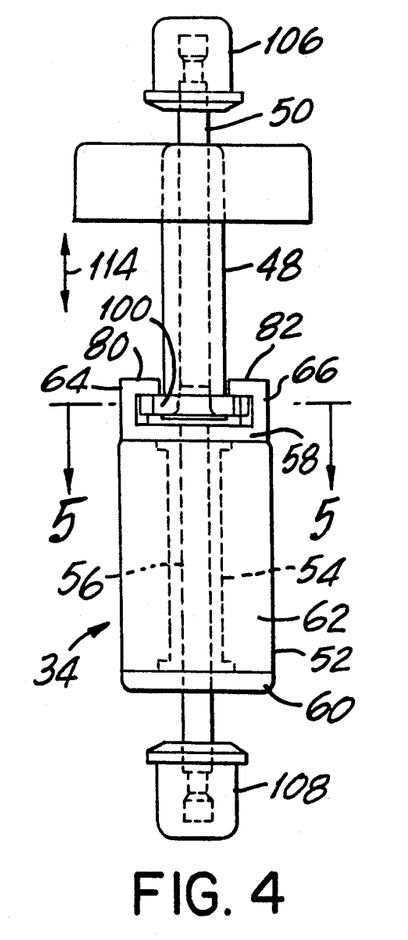
FIG. 4 is a side view of the floating impeller assembly of the present invention, shown removed from the aquarium filter.

With reference now to FIG. 3 and 4, the floating impeller assembly 34 includes a fixed shaft 50 along which there is positioned a rotor 52. The rotor 52 includes a tube portion 54 which has an internal bore 56 and a pair of integrally formed flange portions 58, 60. The rotor 52 is rotatably mounted on the shaft 50. A ceramic magnet 62 which was independently formed is disposed between the flange portions 58, 60. Typically, the ceramic magnet 62 was molded, ground and finished off to provide an insert for the molded rotor 52. It should be understood, however, that other types of magnets could be used and attached by insert molding or other means, as will hereinafter be described.

Figure 7:
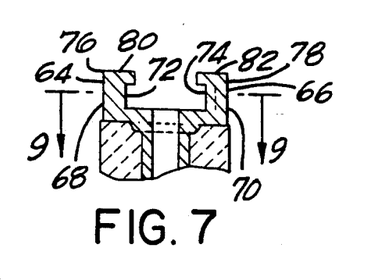
FIG. 7 is a fragmentary cross section view taken along the line 7—7 in FIG. 6.
Figure 8:
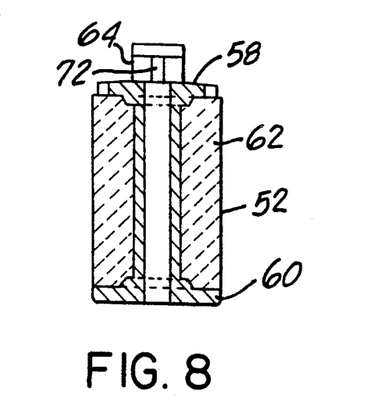
FIG. 8 is a cross sectional view taken along the line 8—8 in FIG. 6.
Figure 9:
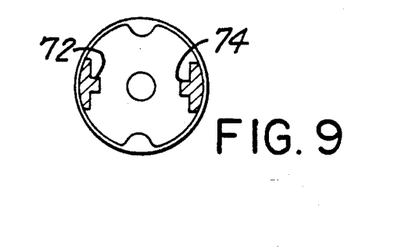
FIG. 9 is a cross sectional view taken along the line 9—9 in FIG. 7.

The upper flange portion 58 is best shown in FIGS. 7-9 includes a pair of upwardly extending arms 64, 66 which cooperate with the impeller unit 48 to form a unitary retaining and clutch mechanism in a manner which will be presently described. In the primary embodiment, shown in FIGS. 3-12, the arms, 64, 66 include vertical portions 68, 70 and a pair of integrally formed rib portions 72, 74, which are in a facing relationship as is best shown in FIG. 9. The upper ends 76, 78 of vertical portions 68, 70, each have an integrally formed horizontal portion 80, 82 which project towards each other as is best shown in FIG. 7.

Figure 10:
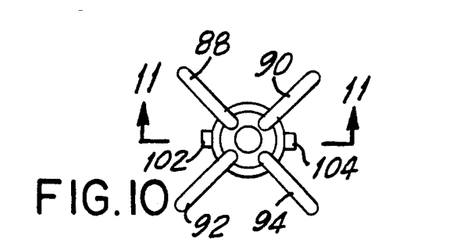
FIG. 10 is a top view of the impeller of the floating impeller assembly of the present invention.
Figure 11:
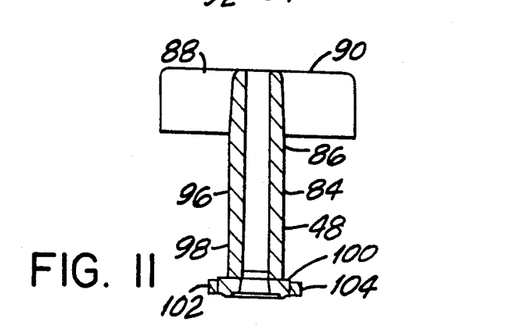
FIG. 11 is cross sectional view taken along the line 11—11 in FIG. 10.
Figure 12:
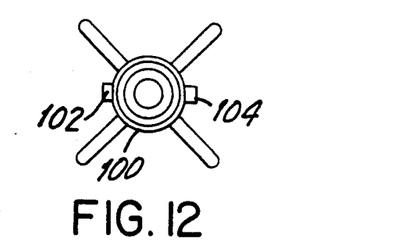
FIG. 12 is a bottom view of the impeller shown in FIGS. 10 and 11.

As is shown in FIGS. 10-12 the impeller unit 48 includes a sleeve portion 84 at the upper end 86 of which are the impeller blades 88, 90, 92, 94. The impeller blades may be rectangular as shown or circular. The sleeve portion 84 has a bore 96 which facilitates rotary mounting the sleeve portion 84 on the shaft 50. The lower end 98 of the sleeve portion 84 has a collar 100 which includes a pair of oppositely directed projecting arm portions 102, 104. The collar 100 is proportioned so as to fit under the horizontal portions 80, 82 of the arms 64, 66 as is shown in FIG. 4.

The horizontal portions 80, 82 of the arms 64, 66 retain the collar 100 and cause the impeller unit 48 and the rotor 52 to move together as a single unit in the vertical direction shown by the arrows 114 in FIG. 4.

Figure 5:
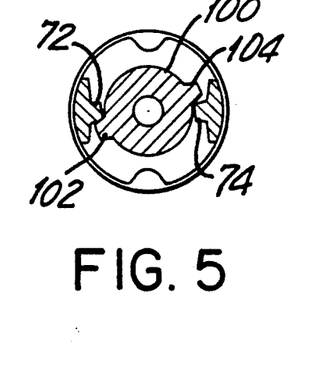
FIG. 5 is a cross sectional view taken along line 5—5 in FIG. 4.
Figure 6:
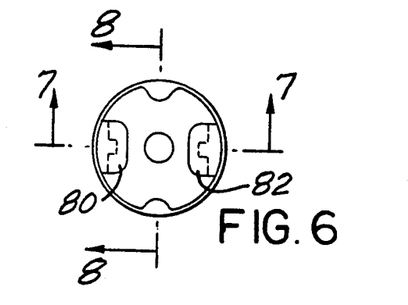
FIG. 6 is a top view of the rotor of the floating impeller assembly of the present invention.

Upon rotation, the rib portions 72, 74 will engage the tabs 102, 104 as is shown in FIG. 5 and thereby cause the rotor 52 to drive the impeller unit 48.

As is shown in FIG. 5, the rib portions 72, 74 engage the tabs 102, 104 after approximately 180 degrees of rotation of the rotor 52 and the contact between the rib portions 72, 74 and the tabs 102, 104 on opposite sides of the shaft 50 provides balanced clutch forces about the shaft center.

The shaft 50 is fixed by means of a plug 106 at the upper end, and a corresponding plug 108 at the lower end. The lower end plug 108 is seated into the bottom of the well 36 in the electromagnetic stator unit 38. The upper plug 106 sits within a seat 110 provided at the lower end 112 of the leg 28 of the intake assembly unit.

The type of motor that is used is a type known as a synchronous motor. With such motors, the rotor unit, or armature, can rotate in either of the two opposite rotational directions. At starting, it is unknown which direction the rotor will take. Normally, synchronous motors require the addition of a starting coil frequently referred to as a shaded coil, or eddy current drive, in order to control the direction of starting rotation. This will serve to insure that each time the motor starts it will operate in the same rotational direction.

In the present application for use with an aquarium filter, either direction of rotation will be suitable. Accordingly, it makes no difference whether the rotor 52 begins a clockwise or counter clockwise direction. The clutch mechanism is such that it will permit the rotor to begin rotation of the first cycle until such time as the portions 72, 74 engage the tabs 102, 104. At that time, it will engage the impeller unit 48 and serve to drive the impeller unit 48 in the same rotational direction in which the rotor is moving. The clutch mechanism also permits the rotor to initially start without the load of the impeller unit. This reduces the inertia upon starting and permits easier start up. Once rotation occurs, the clutch will engage the impeller unit and cause it to rotate in the same direction.

The assembly 34 according to the present invention is able to float in a vertical direction along the fixed shaft 50, as indicated by the arrows 114 in FIG. 4, enabling the rotor 52 to adjust to a suitable position accommodating the magnetic force from the stator and any lift that may be present. However, because the clutch is uniquely positioned, a thinner sleeve can be used which reduces the aerodynamic lift and, thereby, reduces the noise, friction, and wear associated with rubbing of the unit against the washers. The horizontal portions 80, 82 of the arms 64, 66, and the collar 100 couple and retain the impeller unit 48 and the rotor 52 causing the impeller unit 48 and the rotor 52 to move together or float in the vertical direction as defined above.

The coupling of the rotor 52 to the impeller unit 48 along the top flange 58 eliminates the need for a snap-together part onto the rotor 52 and eliminates the problems of the prior art related to lifting of the impeller due to the large aerodynamic forces which are created along the large sleeve supporting the impeller, and also eliminates the need for a thrust washer which was required in the prior art in order to prevent rubbing of the impeller unit against supporting structures.

Figure 13:
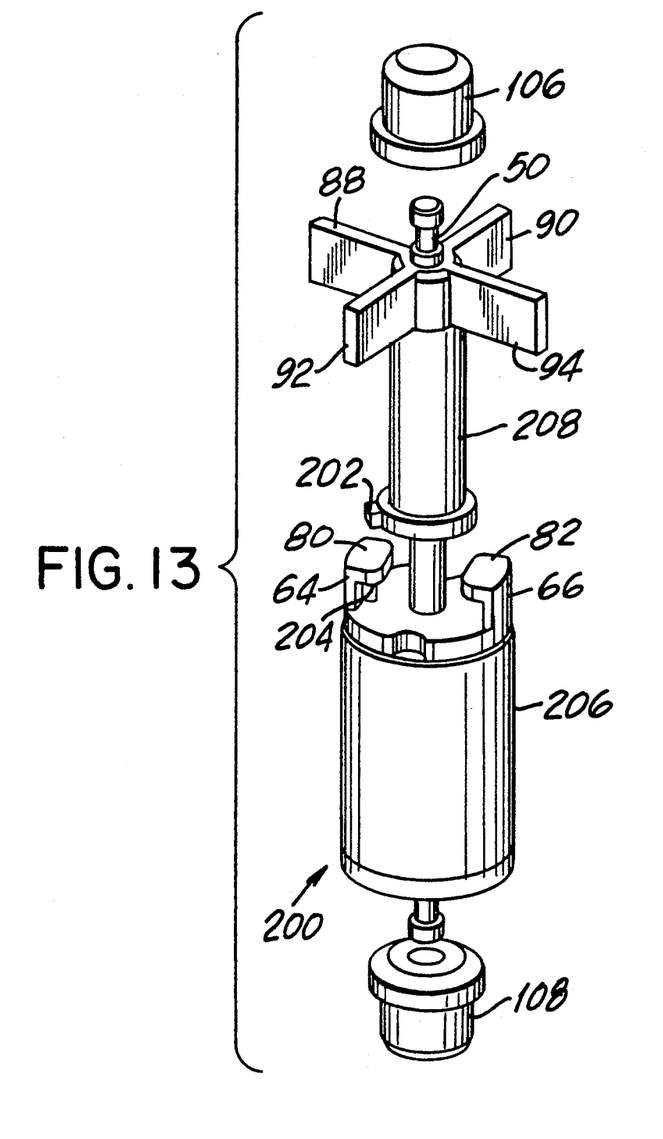
FIG. 13 is an exploded perspective view of a floating impeller assembly of the present invention in accordance with a second embodiment thereof and showing an alternative clutch mechanism.
Figures 14, 15:
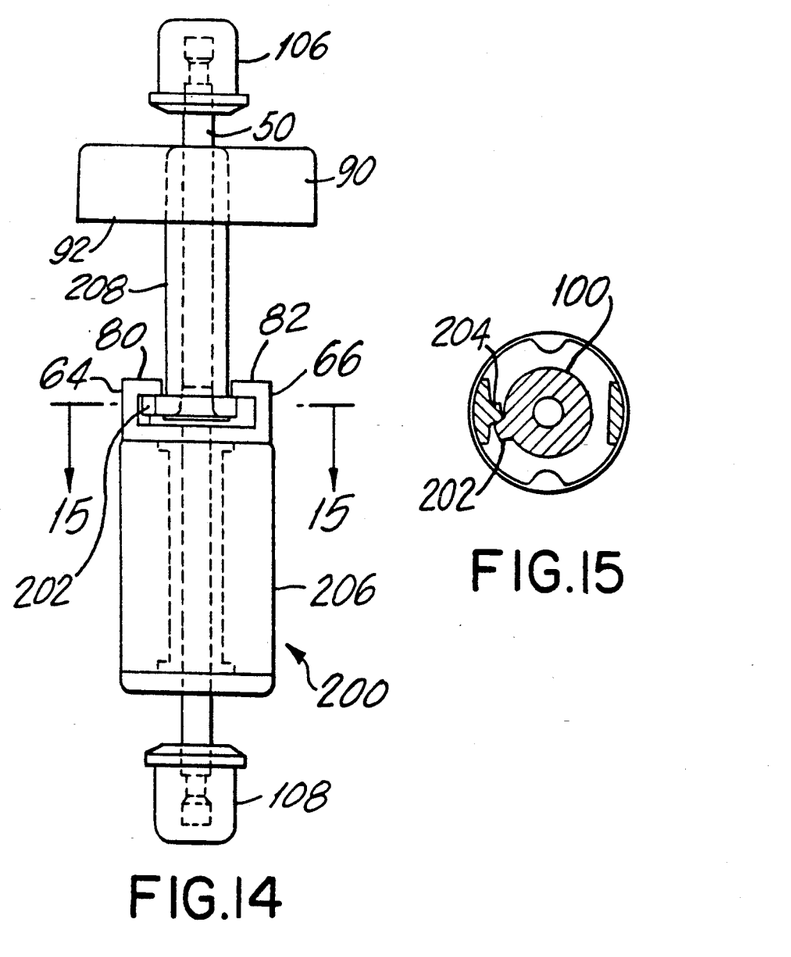
FIG. 14 is a side view of the floating impeller assembly of FIG. 13, shown removed from the aquarium filter.
FIG. 15 is a cross sectional view taken along line 15-15 in FIG. 14.

In a second embodiment of the invention 200 which is shown in FIG. 13-15 the two oppositely directed tabs 102, 104 have been replaced by the single tab 202 on the collar 100 which is formed on the impeller 208 and the two rib portions 72, 74 have been replaced by the single rib portion 204. In this embodiment 200 the rib portion 204 engages the tab 202 after approximately 360 degrees of rotation of the rotor 206. In this embodiment, the rotor can rotate almost a full cycle before engagement thereby building up greater force. However, clutch forces are unbalanced since they occur on only one side of the shaft 50, but the assembly 200 may be appropriate for selected sizes of filters.

Figure 16:
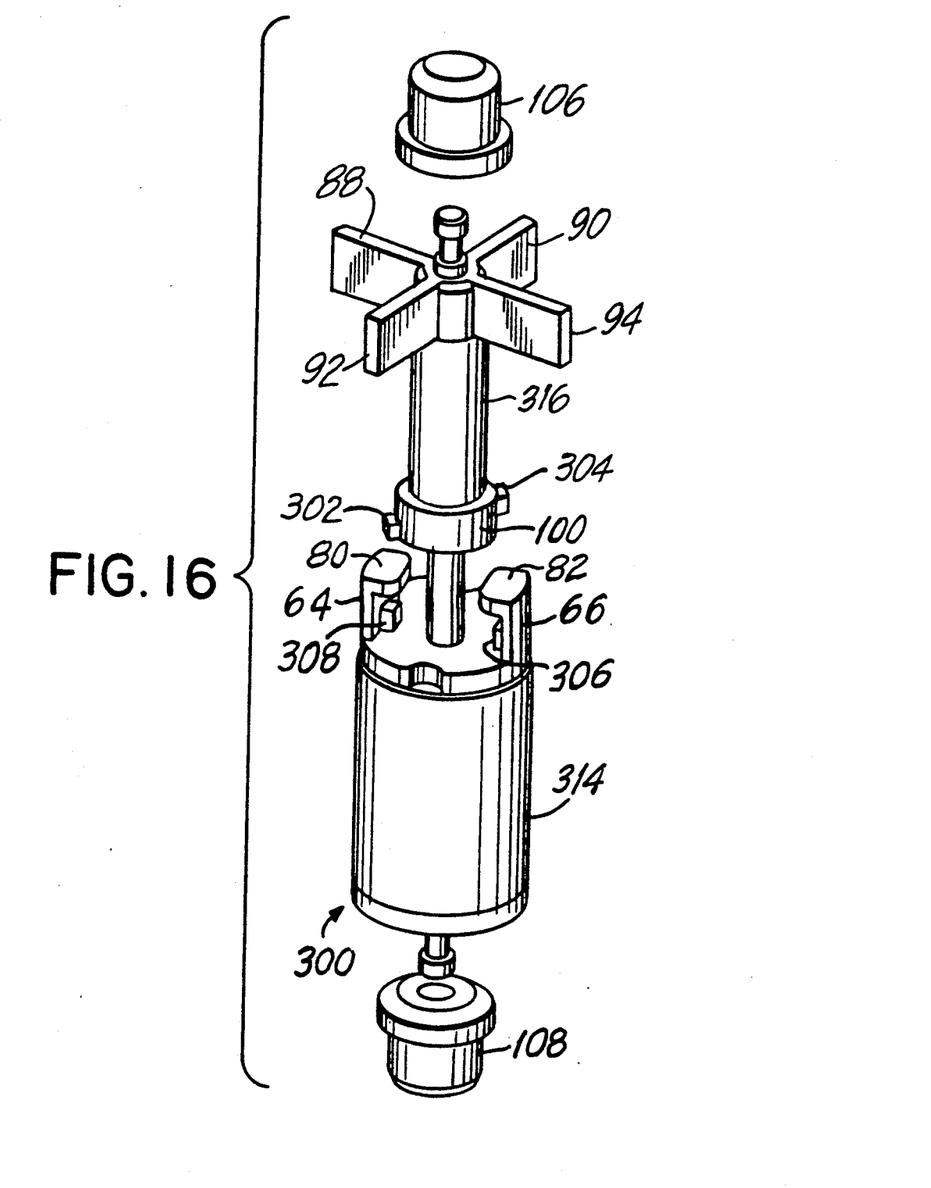
FIG. 16 is an exploded perspective view of a floating impeller assembly of the present invention in accordance with a third embodiment thereof and showing another alternative clutch mechanism.
Figures 17, 18:
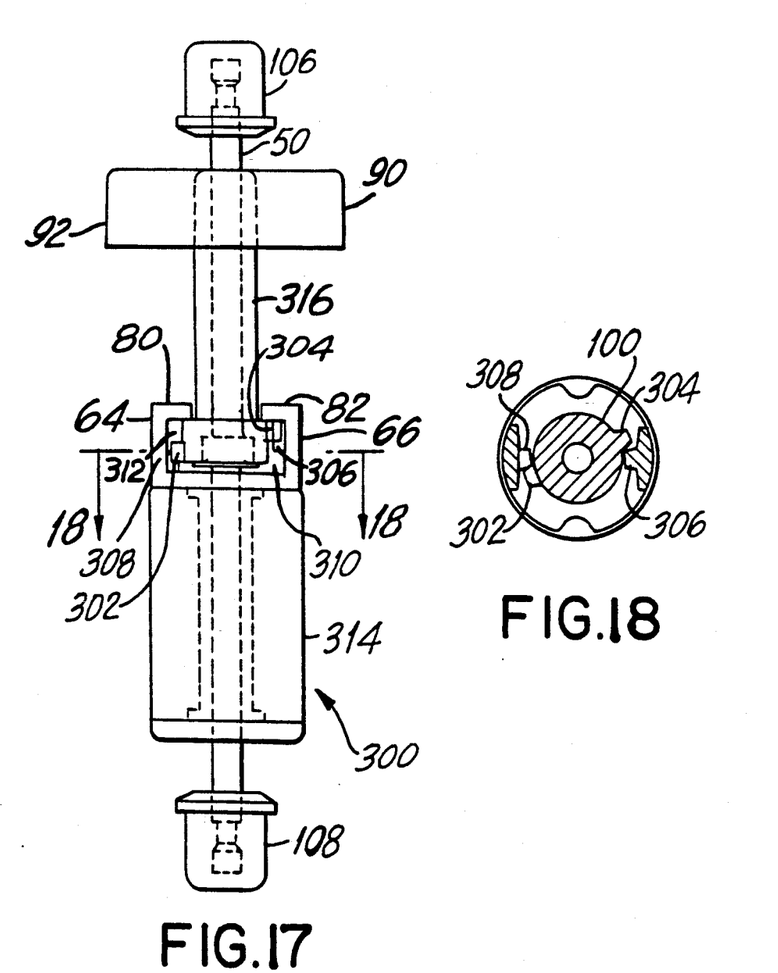
FIG. 17 is a side view of the floating impeller assembly of FIG. 16 shown removed from the aquarium filter.
FIG. 18 is a cross sectional view taken along line 18—18 in FIG. 17.

In a third embodiment 300 of the invention 300 which is shown in FIGS. 16-18, the oppositely directed tabs 102, 104 which were generally in line when viewed as in FIG. 11 have been replaced by a pair of oppositely directed tabs 302, 304 which are parallel to each other when viewed as in FIG. 16 and which project from the collar 100 which is formed on the impeller 316. The two rib portions 306, 308 each have a space 310, 312 which is formed to permit passage of a tab so that the tab 304 can pass through the space 312 and contact the rib portion 306 and the tab 302 can pass through the space 310 and contact the rib portion 308. The tabs 302, 304 engage the rib portions 306, 308 after approximately 360 degrees of rotation of the rotor 314 and the clutch forces are balanced since they occur on opposite sides of the shaft 50.

In the second and third embodiments of the invention 200, 300 the horizontal portions 80, 82 of the arms 64, 66 retain the collar 100 in the manner previously described in connection with the first embodiment 10 and cause the impeller unit 208 and the rotor 206 in the second embodiment 200, and the impeller unit 316 and the rotor 314, in the third embodiment 300 to move together, or float, in the vertical direction as defined by the arrows 114 in FIG. 4.

Figure 19:
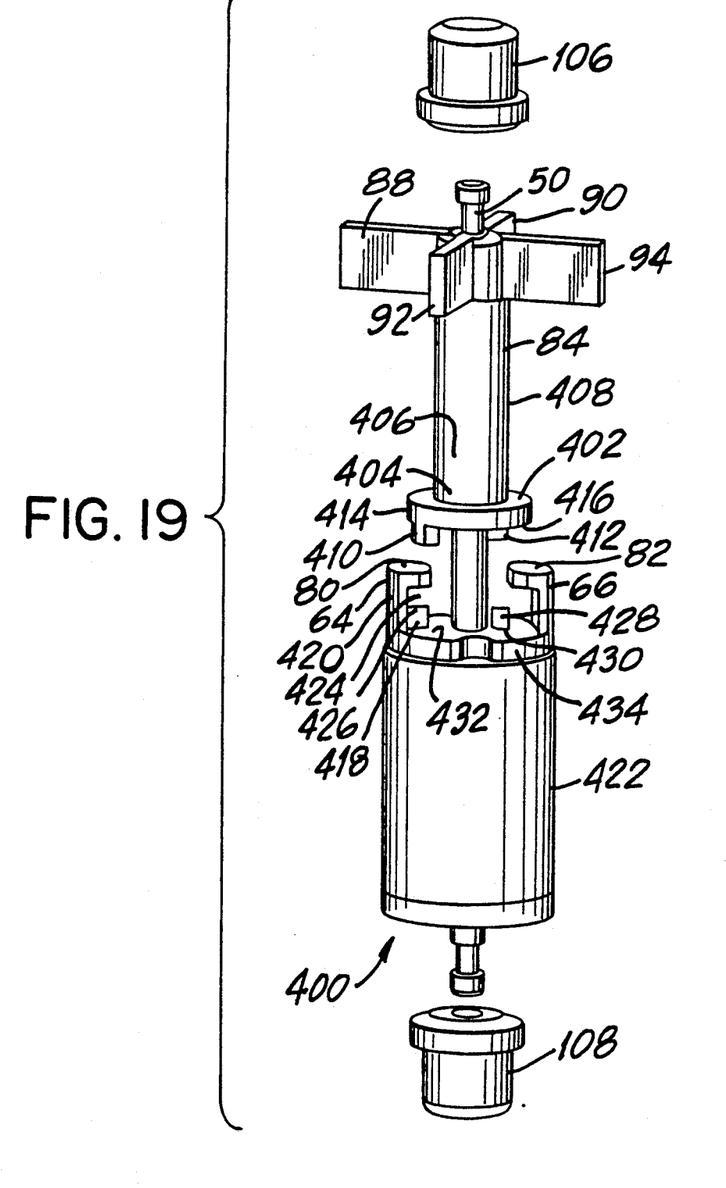
FIG. 19 is perspective view of a floating impeller assembly of the present invention in accordance with a fourth embodiment thereof and showing yet another clutch mechanism.
Figure 20:
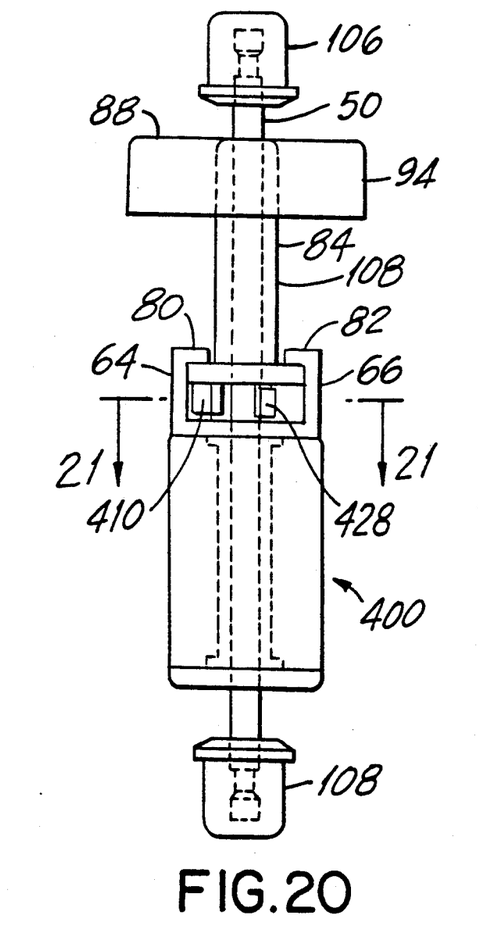
FIG. 20 is a side view of the floating impeller assembly of FIG. 19 shown removed from the aquarium filter.
Figure 21:
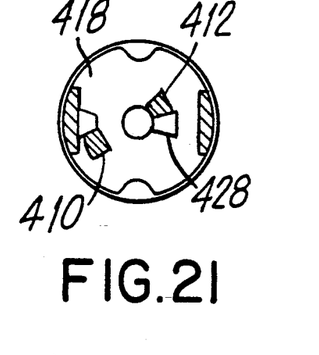
FIG. 21 is a cross sectional view taken along line 21—21 in FIG. 20.

In a fourth embodiment of the invention 400, which is shown in FIGS. 19-21, a collar 402 is integrally formed on the lower portion 404 of the sleeve portion 406 of the impeller 408 and a pair of integrally formed tabs 410, 412 project from the collar 402 in a downward direction. The first tab 410 is disposed at the edge 414 of the collar 402 and the second tab 412 is disposed at an intermediate position 416 on the collar 402. A rib portion 418 is formed on the vertical portion 420 of the arm 64.

A space 424 is formed at the upper end 426 of the rib portion 418 which is capable of accommodating the collar 402 as is shown in FIGS. 19 and 20. A post 428 is provided which projects in an upward direction from an intermediate location 430 on the surface 432 of the upper flange 434 of the rotor 422. The tab 410 is positioned so as to contact the rib portion 418 and the tab 412 is positioned so as to contact the post 428 as is best shown in FIG. 21. In this embodiment 400, the tab 410 engages the rib portion 418 and the tab 412 engages the post 428 after approximately 360 degrees of rotation of the rotor 422 and the clutch forces are approximately balanced since they occur on opposite sides of the shaft 50. The horizontal portions 80, 82 of the legs 64, 66 retain the collar 402 and couple the impeller 408 and the rotor 422 in the manner previously described and cause the impeller 408 and the rotor 422 to move together in the vertical direction previously defined by the arrows 114 in FIG. 4.

Figure 22:
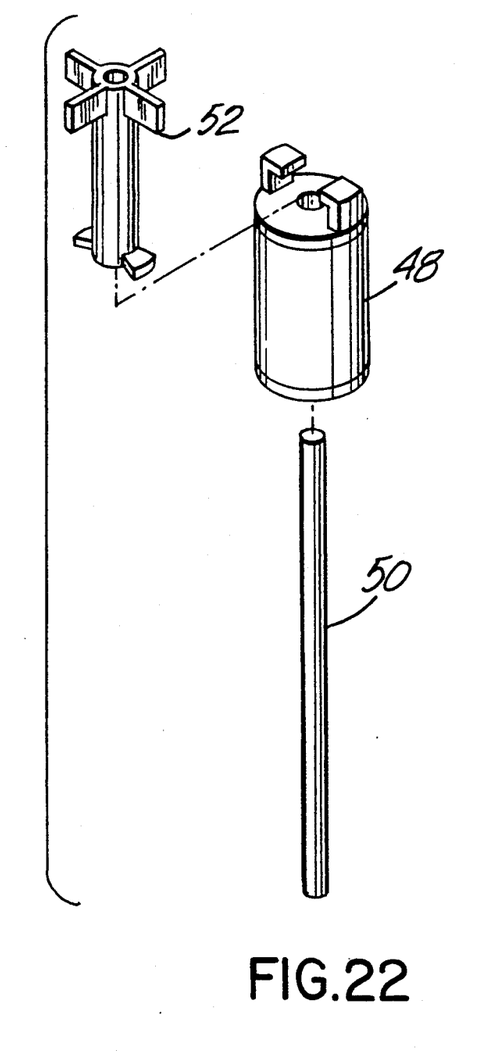
FIG. 22 is an exploded view explaining the assembly of the unit shown in the first embodiment.

The floating impeller assembly of the present invention provides for a unique assembly which avoids snapping together of the parts. As shown in FIG. 22, initially the impeller unit is slid horizontally along the upper flange of the rotor unit. Once they are coaxially aligned, the shaft 50 is slid axially through the coupled impeller and rotor. The caps 106 and 108 are placed on the shaft and the shaft then locks the assembly in place.

Figure 23:
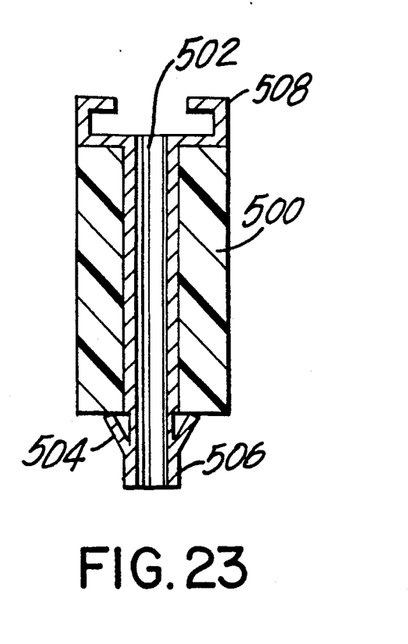
FIG. 23 shows a cross sectional view of an alternate construction for the magnet and rotor.

As shown in FIG. 23, various types of magnets can be used with the rotor unit of the present invention. The magnet 500 can be a plastic magnet which is separately molded. The rotor unit 502 includes a series of deflecting tabs 504 along its central hub 506. To assemble, the magnet is slid onto the hub 506 and pushed upwardly causing the tabs 504 to deflect. Once the magnet is in place it is retained securely between the tabs 504 and the upper flange 508.

Alternately, the magnet could be secured in place by an external washer locked onto the bottom, or other means.

There has been disclosed heretofore the best embodiments of the invention presently contemplated. However, it is to be understood that various changes and modifications may be made thereto without departing from the spirit of the invention.

What is claimed is:

1. An aquarium filter comprising a filter housing having an intake chamber for receiving contaminated aquarium water and a filter chamber in which the contaminated aquarium water is filtered and subsequently discharged back to an aquarium, a stator unit mounted on said filter housing, a floating impeller assembly electromagnetically driven by said stator unit, said floating impeller assembly comprising a shaft, a magnetic rotor rotatably mounted on said shaft, an impeller unit rotatably mounted on said shaft, said impeller unit drawing said aquarium water into said filter, and unitary retaining and clutch means mounted on said rotor for the purpose of retaining and rotatably driving said impeller unit by means of rotation of said rotor, said unitary retaining and clutch means comprising a pair of arms extending from said rotor and including an inwardly directed portion projecting from each of said arms, a collar formed on the exterior of said impeller unit, said inwardly directed portions projecting over said collar formed on said impeller unit and thereby retaining said impeller unit and said rotor.

2. An aquarium filter as in claim 1 in which said magnetic rotor comprises an upper flange member, and in which said unitary retaining and clutch means are mounted on said upper flange member.

3. An aquarium filter as in claim 1 in which said unitary retaining and clutch means further comprise a pair of radially inwardly directed rib members projecting, one each, from said arms and a pair of tabs projecting from said impeller unit with said tabs disposed for contact with said rib members after predetermined rotation of said rotor.

4. An aquarium filter as in claim 3 in which said tabs each project radially outwardly relative to said impellar unit.

5. An aquarium filter as in claim 4 in which said tabs are in general alignment.

6. An aquarium filter as in claim 3 in which said rib members are disposed on opposite side of said shaft.

7. An aquarium filter as in claim 1 in which said unitary retaining and clutch means comprises a single rib member projecting from one of said arms and a single tab projecting from said impeller unit with said tab disposed for contact with said rib member after predetermined rotations of said rotor.

8. An aquarium filter as in claim 7 in which said rib member projects radially inwardly relative to said rotor and in which said tabs project outwardly relative to said impeller unit.

9. An aquarium filter as in claim 1 in which said unitary retaining and clutch means comprises a first and a second upwardly projecting post, each extending from said rotor and a first and a second downwardly projecting tab each depending from said impeller unit, with said first upwardly projecting post disposed for contact with said first downwardly projecting tab and with said second upwardly projecting post disposed for contact with said second downwardly projecting tab after predetermined rotation of said rotor.

10. An aquarium filter as in claim 9 in which said first and said second upwardly projecting posts are disposed on opposite side of said shaft.

11. An aquarium filter as in claim 1 in which said unitary retaining and clutch means comprises an upper rib and a lower rib each projecting from said rotor and an upper tab and a lower tab each projecting from said impeller unit with said upper rib disposed for contact with said upper tab and with said lower rib disposed for contact with said lower tab after predetermined rotation of said rotor.

12. An aquarium filter as in claim 11 in which said upper rib and said lower rib are disposed on opposite sides of said shaft.

13. An aquarium filter as in claim 1 in which said magnetic rotor comprises a molded magnetic portion.

14. An aquarium filter as in claim 13, wherein said molded magnetic portion comprises an annular cylindrical member and is separately molded from said rotor and thereafter slidably mounted on said rotor, and further comprising means for retaining said molded magnet onto said rotor.

15. An aquarium filter as in claim 14, wherein said retaining means comprise deflecting tabs along said rotor deflecting during mounting of said magnet on said rotor and thereafter retaining said magnet in place on said rotor.

16. An aquarium filter as in claim 1 in which said arms are oppositely disposed on said rotor.

17. An aquarium filter as in claim 1 in which said inwardly directed portions are substantially perpendicular to said shaft.

18. An aquarium filter as in claim 1, wherein said impeller unit comprises impeller blades mounted on a thin sleeve, said collar extending radially about the exterior of said sleeve.

19. An aquarium filter as in claim 18, wherein said unity clutch means further comprises tabs extending from said collar.

20. An aquarium filter as in claim 1, wherein said impeller unit is horizontally slidable relative to said magnetic rotor with said collar secured under said arms, and wherein said shaft is axially slidable through said impeller unit and magnetic rotor to lock together said impeller unit and magnetic rotor.

* * * * *